United States Patent [19]

Tabata et al.

[11] Patent Number: 4,889,068
[45] Date of Patent: Dec. 26, 1989

[54] DECELERATION SENSOR

[75] Inventors: Hiroshi Tabata; Akihiko Akiyama, both of Wako, Japan

[73] Assignee: Honda Giken Kogyo Kabushiki Kaisha, Tokyo, Japan

[21] Appl. No.: 203,809

[22] Filed: Jun. 8, 1988

[30] Foreign Application Priority Data

Jun. 9, 1987 [JP] Japan .................. 62-143637
Jun. 9, 1987 [JP] Japan .................. 62-143639

[51] Int. Cl.⁴ .......................................... H01H 35/14
[52] U.S. Cl. ................................ 116/203; 200/61.53; 102/274; 102/252; 280/806; 180/282
[58] Field of Search ................ 73/514; 200/61.45 R, 200/61.53, 61.5; 116/203, 215, 67 R; 102/231, 234, 247, 252, 272, 274; 180/282; 280/734; 60/635, 636; 242/107.4 R, 107.4 S

[56] References Cited

U.S. PATENT DOCUMENTS

| | | | |
|---|---|---|---|
| 2,941,472 | 6/1960 | Lee et al. ............................ | 102/274 |
| 3,226,504 | 12/1965 | Gallistel et al. .................. | 200/61.53 |
| 4,167,276 | 9/1979 | Bell et al. ......................... | 200/61.53 |
| 4,580,810 | 4/1986 | Thuen ................................ | 280/734 |

FOREIGN PATENT DOCUMENTS 60-259553 12/1985 Japan .

Primary Examiner—Charles A. Marmor
Assistant Examiner—Karin Tyson
Attorney, Agent, or Firm—Nixon & Vanderhye

[57] ABSTRACT

A deceleration sensor for detecting a threshold level of deceleration indicative of a vehicle collision, comprising a pair of sensor masses in the form of pendulums, a spring-loaded firing pin, a pair of trigger levers which individually hold the firing pin in a dormant state as long as they are held by the sensor masses in their neutral states but can be individually disengaged from the sensor masses by the motion of the sensor masses as a result of detecting a deceleration level greater than the threshold level. Since the firing pin is released only when both the trigger levers are released from their neutral states, the reliability of the dormant state of the firing pin is assured. To the end of improving the reliability of the activation of the firing pin, the firing pin may be spring-loaded by a pair of springs in such a manner that either spring is sufficient for the activation of the firing pin.

10 Claims, 5 Drawing Sheets

DECELERATION SENSOR

TECHNICAL FIELD

The present invention relates to a deceleration sensor for activating a passive occupant restraint system of a vehicle by detecting a level of deceleration which is indicative of a vehicle collision.

BACKGROUND OF THE INVENTION

A seat belt for restraining a vehicle occupant from being thrown from the seat of the vehicle in case of a vehicle collision is required to be capable of positively restraining the occupant and yet permitting some freedom of motion to the occupant. A spring loaded retractor having an inertia lock mechanism serves such a purpose but a slight pay out of the belt from the retractor is unavoidable in case of a collision and some slack is always present even before the occurrence of a collision. Such a slack in the seat belt is undesirable because upon occurrence of a collision the occupant is initially thrown forward as far as permitted by the slack of the seat belt and then abruptly stopped by the seat belt. Therefore, if an excessive slack is present in the seat belt, the seat belt is incapable of achieving its full capability to positively restrain the vehicle occupant in case of a vehicle collision. Therefore, it is desirable to reduce any such slack in the seat belt to a smallest possible level so as to reduce such a delayed action of the seat belt to restrain the vehicle occupant.

Japanese patent laid open publication No. 60-259553 proposes a device for tightening a seat belt upon detection of a certain level of deceleration. U.S. Pat. No. 4,580,810 discloses a passive occupant restraint system in the form of an air bag fitted into a steering wheel so as to rapidly inflate upon detection of a collision.

In any of these passive occupant restraint systems, it is essential for the system to be able to be activated without fail when required and otherwise stay dormant because unnecessary activation of such a system not only imposes a great inconvenience on the occupant but also may prevent the driver from handling the vehicle in a safe fashion.

In copending patent application No. 132,257 filed Dec. 14, 1987, there is proposed a deceleration sensor which comprises a pair of sensor masses which act upon a single trigger member with the aim of improving the reliability of the action of the sensor when a level of deceleration indicative of a vehicle collision is detected. The contents of this copending application are incorporated herein by reference.

BRIEF SUMMARY OF THE INVENTION

In view of such a desire to improve the reliability of a deceleration sensor in a passive occupant restraint system of a vehicle, a primary object of the present invention is to provide a deceleration sensor which is safe from undesired activation.

A second object of the present invention is to provide a deceleration sensor for a passive occupant restraint system of a vehicle which is reliable in that it would not fail to be activated upon detection of a level of deceleration indicative of a vehicle collision.

A third object of the present invention is to provide such a deceleration sensor which is simple in structure and easy to manufacture.

These and other objects of the present inventio can be accomplished by providing a deceleration sensor device for releasing energy stored in energy storage means upon detection of an acceleration or deceleration in excess of a certain threshold level, comprising: energy releasing means urged by first spring means in a direction to cause the energy storage means to release energy thereof; at least a pair of sensor masses which are urged by second spring means to a neutral state and guided to be individually moved against a spring force of the second spring means under their own inertia forces upon detection of an acceleration or deceleration in excess of a certain threshold level; trigger means cooperating with the sensor masses for retaining the energy releasing means to its dormant state until the sensor masses are moved under their own inertia forces; the sensor masses being adapted to be moved independently from each other and the trigger means being enabled to activate the energy releasing means only when two of the sensor masses are both moved under their own inertia forces. In a preferred embodiment hereof, the energy storage means may comprise a fuse and an explosive cartridge and the energy releasing means may comprise a firing pin for detonating the fuse and cartridge.

Since the energy releasing means is activated only when both the sensor masses are moved under their own inertia forces, the reliability of the dormant state of the energy releasing means is assured. The trigger means may conveniently comprise a trigger member having a pair of engagement means adapted to be individually engaged by the corresponding sensor masses. According to a preferred embodiment of the present invention featuring a compact design, the sensor masses comprises a pair of pendulums which are pivoted by coaxial pins for motion along mutually parallel directions, and the trigger means comprises a pair of mutually parallel trigger levers which are pivotally supported by a sensor body by way of a lateral pivot pin which is integrally connected to and across the trigger levers, each of the trigger levers comprising a first end which is engaged to the energy releasing means, a middle part integrally connected to the lateral pivot pin, and a second end which is normally engaged to one of the sensor masses.

According to a particularly preferred embodiment of the present invention, the energy releasing means comprises a firing pin having an annular groove on its outer circumference and the first end of each of the trigger levers is provided with an inwardly directed lateral pin, the inwardly directed lateral pins of the trigger levers being normally engaged with the annular groove of the firing pin. This arrangement permits an easy assembly of the system as well as a compact design of the system.

To the end of assuring reliable activation of the energy releasing means, the first spring means may comprise at least a pair of spring members. These spring members may be conveniently incorporated into a sensor body by providing that the energy releasing means comprises a firing pin having an open ended hollow rear end received in an annular gap defined by a bore formed in a sensor body and a central rod fixedly held therein in a concentric relationship, and one of the spring members consists of a first compression coil spring interposed between an internal front end surface of the hollow rear end of the firing pin and a front end surface of the central rod while the other of the spring members consists of a second compression coil spring which is interposed between an annular rear end surface of the hollow rear end of the firing pin and a shoulder surface defined in a rear part of the central rod.

BRIEF DESCRIPTION OF THE DRAWINGS

Now the present invention is described in the following with reference to the appended drawings, in which.

DETAILED DESCRIPTION OF THE INVENTION

Figure 1:
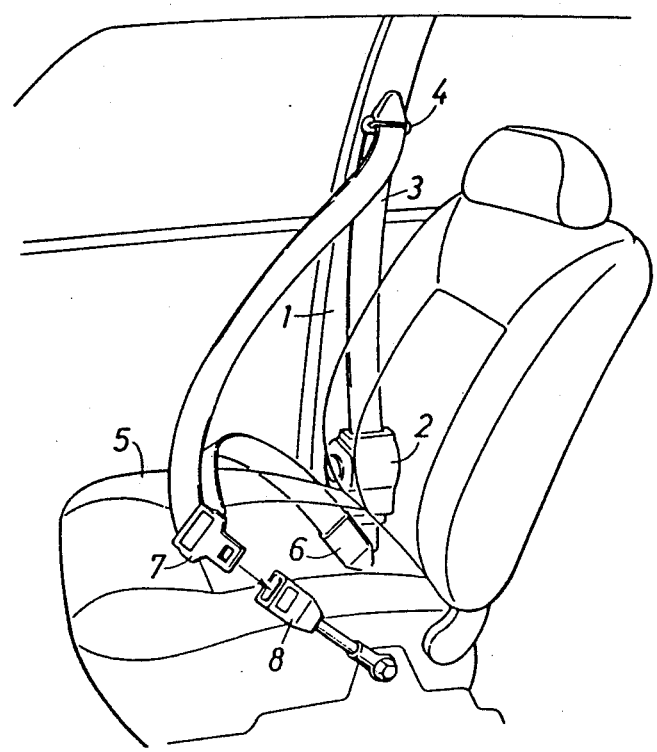
FIG. 1 is a simplified perspective view of a vehicle safety seat belt system to which the deceleration sensor of the present invention can be applied.

FIG. 1 shows a seat belt system to which the present invention is applied. A seat belt 3 paid out from a retractor 2 provided at the lower end of a center pillar 1 of the vehicle body extends along the center pillar 1 and is passed through a through ring 4 attached to an upper part of the center pillar 1. The seat belt 3 then extends downwards from the through ring 4 and is anchored at its free end 6 to a rear, side portion of a seat 5 adjacent to the retractor 2. The span of the seat belt 3 between the through ring 4 and the terminal end 6 is passed through a tongue plate 7 so as to permit a sliding motion of the tongue plate 7 along the span of the seat belt 3. A buckle 8 is attached to a part of a floor tunnel adjacent to a rear, side (opposite to the side of the seat belt where the terminal end 6 of the seat belt is anchored) portion of the seat 5.

When a vehicle occupant is seated in the seat 5, the seat belt 3 is pulled out from the retractor 2 and the tongue plate 7 is passed in front of the occupant and fitted into the buckle 8 provided on the opposite side of the seat 5. Thus, the seat belt 3 is passed diagonally across the chest and laterally across the waist of the occupant.

Figure 2:
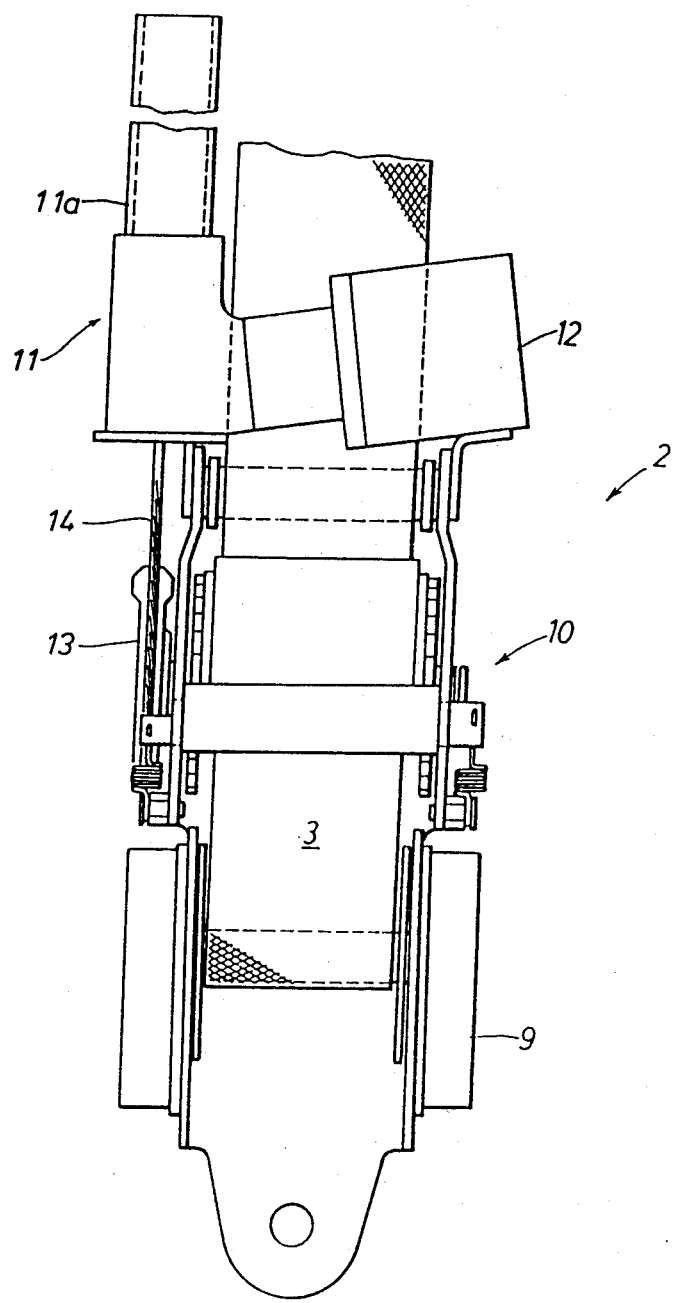
FIG. 2 is a magnified view of a part of FIG. 1 which is adapted to remove a slack from the seat belt upon detection of a deceleration indicative of a vehicle collision.

As shown FIG. 2, the retractor 2 is provided with an ELR device 9 which permits pay out of the seat belt 3 freely under normal condition, a tensioning device 10 for removing a slack in the belt 3 in case of an emergency, a drive device 11 for supplying necessary drive power to the tensioning device 10, and a deceleration (acceleration) sensor 12 for detecting a level of deceleration indicative of a vehicle collision. In this embodiment, the drive device 11 comprises a tube 11a, an explosive cartridge received therein, a member which is adapted to be driven within the tube 11a by the explosive gas pressure and is connected to a drive pulley 13 of the tensioning device 10 by way of a pull cable 14.

Figure 3:
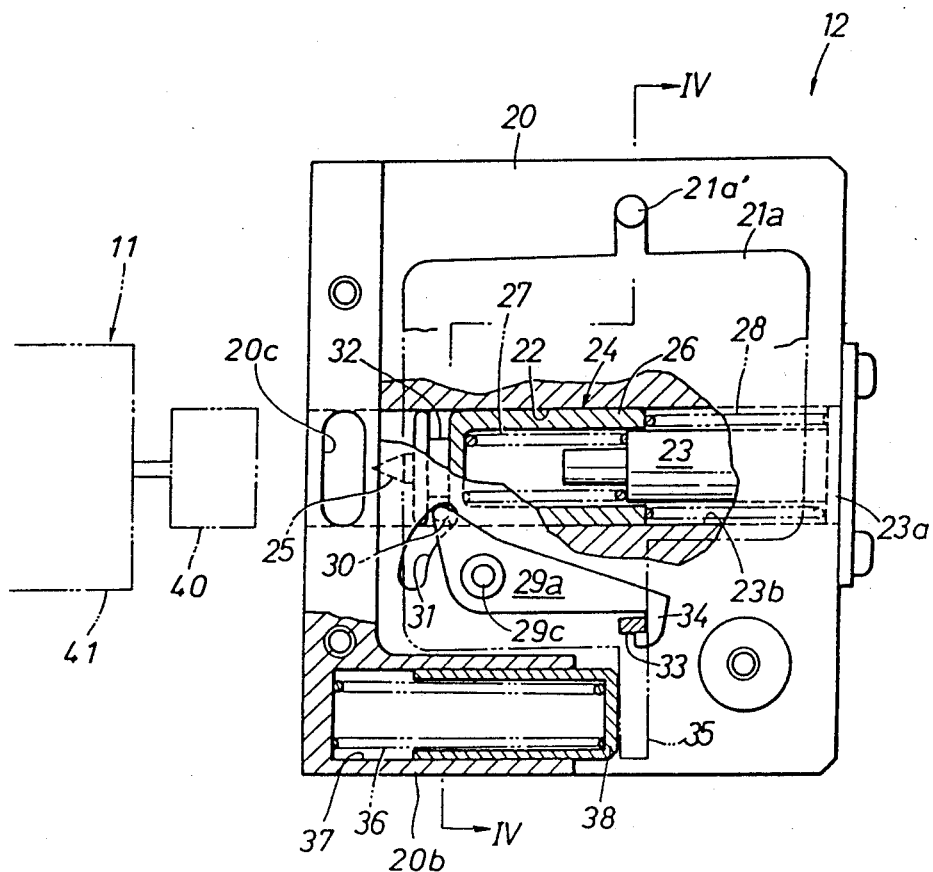
FIG. 3 is a partly broken away side view of a preferred embodiment of the deceleration sensor according to the present invention in its dormant state.
Figure 4:
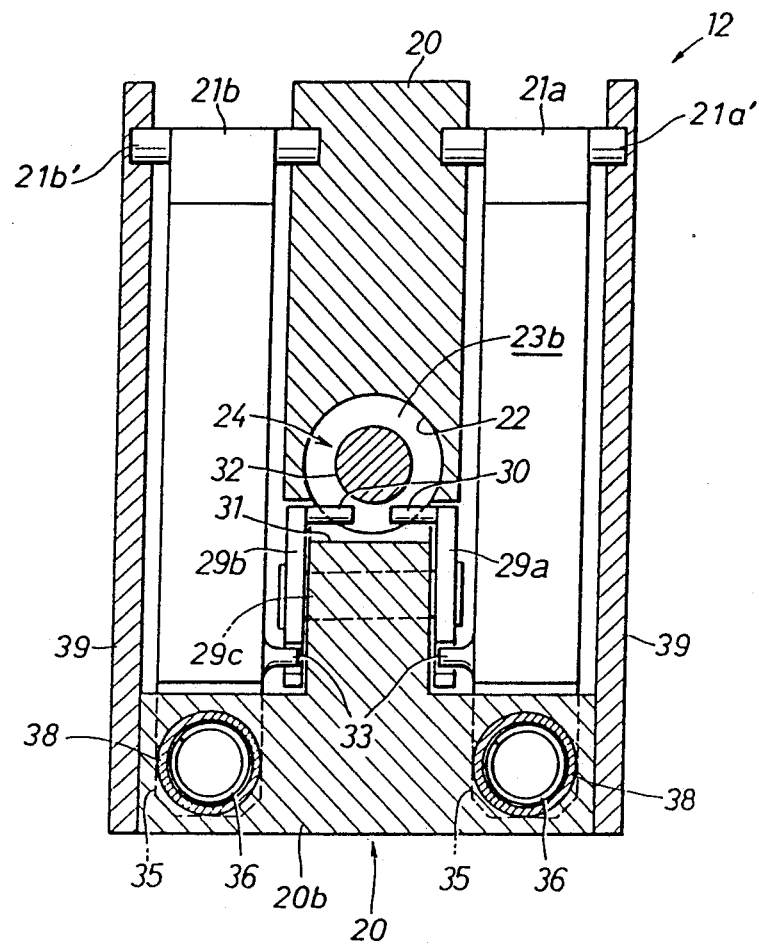
FIG. 4 is a sectional view taken along line IV—IV of FIG. 3.

FIGS. 3 and 4 show the deceleration sensor 12 in greater detail.

A pair of swing masses 21a and 21b are supported one on each side of a sensor body 20 by way of lateral pins 21a' and 21b' provided at their upper ends in the manner of a pair of pendulums having pivot points at their upper ends. These two sensor masses 21a and 21b are permitted to move independently from each other without interfering with each other. A middle part 20a of the sensor body 20 intermediate between the two sensor masses 21a and 21b is provided with a central guide bore 22 extending through the sensor body 20 along a tangential direction of the motion of the sensor masses 21a and 21b. The rear end of the central guide bore 22 is closed by a flange 23a of a rod member 23 which is coaxially received in the central guide bore 22 defining an annular gap 23b therebetween. A firing pin 24 having a pointed front end 25 and a hollow rear part 26 is guided within the central guide bore 22, with its hollow rear part 26 slidably received in the annular gap 23b. A pair of compression coil springs 27 and 28 having different diameters urge the firing pin 24 forwardly, one of the compression springs 28 interposed between the flange 23a and the rear end surface of the hollow part 26 of the firing pin 24 while the other compression coil spring 27 is interposed between the inner end surface of the front portion of the firing pin 24 and an annular shoulder surface of a front part of the rod member 23.

A pair of trigger levers 29a and 29b are supported one on either side of the middle part 20a of the sensor body 20 by means of a common shaft 29c passed laterally through the middle part 20a of the sensor body 20 and integrally connected to the trigger levers 29a and 29b. A front end of each of the trigger levers 29a and 29b is provided with a laterally, inwardly projecting pin 30 which is passed through an arcuate slot 31 provided in the middle part 20a of the sensor body 20 and engages an annular groove 32 provided in a front part of the firing pin 24. The other end of each of the trigger levers 29a and 29b is shaped into a hook 34 which engages a lateral projection 33 provided in the corresponding sensor mass 21a or 21b. The firing pin 24 is thus urged forwardly by the two compression coil springs 27 and 28 but is held in the illustrated position by the pins 30 of the trigger levers 29a and 29b which are in turn held in the illustrated positions by their hooked rear ends 34 engaging the lateral projections 33 of the sensor masses 21a and 21b. Numeral 20c denotes a slot which is laterally passed through the middle part 20a of the sensor body 20 for receiving therein a safety pin (not shown in the drawings) for preventing the activation of the firing pin 24 before finally installing the deceleration sensor into a vehicle or during the servicing of the vehicle.

The base part 20b of the sensor body 20 is provided with a pair of parallel bores 37 extending in parallel with the central guide bore 22, each of the parallel bores 37 having a closed front end and an open rear end. Each of these bores 37 receives a hollow rod 38 and a compression coil spring 36 urging the rod 38 rearwardly against an extension 35 of the corresponding sensor mass 21a or 21b depending therefrom.

As best shown in FIG. 4, the lateral sides of the sensor device 12 are covered by a pair of side plates 39 which are fixedly secured to the sensor body 20.

Adjacent to the pointed front end 25 of the firing pin 24 is provided a fuse 40 for igniting an explosive cartridge 41 of the drive device 11.

Figure 5:
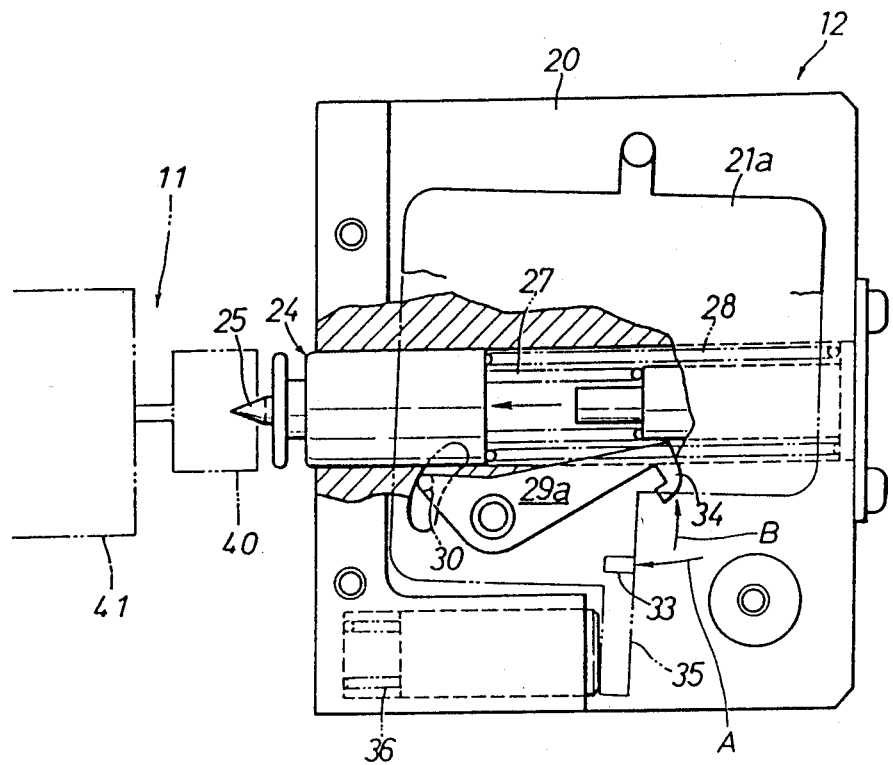
FIG. 5 is a view similar to FIG. 3 showing the deceleration sensor when the firing pin is activated.

In case of a vehicle collision, a deceleration in excess of a certain threshold level occurs and it is detected as an inertia force acting upon the sensor masses 21a and 21b which overcomes the biasing force of the compression coil springs 36. Thus, the sensor masses 21a and 21b are swung forwardly (as indicated by arrow A in FIG. 5) and disengage the hooks 34 of the trigger levers 29a and 29b from the lateral projections 33 of the sensor masses 21a and 21b (as indicated by arrow B in FIG. 5). The restraint acting upon the trigger levers 29a and 29b is thus removed and the firing pin 24 is allowed to be shot forward against the fuse 40 under the spring force of the compression coil springs 27 and 28. As a result, the explosive cartridge 41 is ignited and the cable 14 is pulled out from the tensioning device 10 which in turns removes a slack from the belt 3.

It is essential for a deceleration sensor device of this kind to have a high level of reliability in being activated without fail when required (in the case of a vehicle collision) and in being not activated when not required (under normal conditions). Therefore, according to the present invention, two sensors masses 21a and 21b and corresponding trigger levers 29a and 29b, respectively, are used so that even when one of the trigger levers 29a and 29b is inadvertently disengaged from the corresponding sensor mass 21a or 21b due to a system failure or other unforeseeable circumstances, the firing pin 24 would not be totally disengaged from the trigger levers 29a and 29b. In other words, for the firing pin 24 to be disengaged and shot forward under the spring force of the compression coil spring 27 and 28, it is necessary that the trigger levers 29a and 29b are both disengaged from the lateral projections of the sensor masses 21a and 21b. In this respect, the reliability of the dormancy of the deceleration sensor is improved.

Since the firing pin 24 is urged forward by the two compression coil springs 27 and 28, even when one of the compression coil springs 27 and 28 is disabled due to any unforeseeable circumstance, the firing pin can be still shot forward by either one of the compression coil springs 27 and 28. In this respect, the reliability of the activation of the deceleration sensor is improved. It is possible to use spring means of other types instead of using two compression coil springs. Further, since the direction of the flight of the firing pin 24 when it is activated agrees with the direction of the inertia force acting upon the firing pin 24 in case of the occurrence of a deceleration indicative of a vehicle collision, the reliability of the activation of the deceleration sensor 12 is improved.

Although the present invention has been described in terms of a preferred embodiment applied to a system for removing a slack from a seat belt upon detection of a vehicle collision, it can be applied to other passive vehicle occupant restraint systems such as air bag systems among other possible applications where detection of a threshold level of deceleration or acceleration is required.

What we claim is:

1. A sensor device for releasing energy stored in an energy storage means upon detection of an acceleration or deceleration in excess of a certain threshold level, comprising:

energy releasing means urged by first spring means in a direction to cause the energy storage means to release energy thereof;
   a pair of sensor masses;
   means mounting said sensor masses for movement independently of one another;
   second spring means for urging said masses into a neutral state and guiding said masses for individual movement against a spring force of the second spring means in response to inertial forces acting on said masses upon detection of an acceleration or deceleration in excess of a certain threshold level; and
   trigger means cooperating with the sensor masses for retaining the energy releasing means in its dormant state and responsive to movement of both said sensor masses under their inertial forces to activate said energy releasing means only when both of said sensor masses are moved under the inertial forces.

2. A sensor as defined in claim 1, wherein the trigger means comprises a trigger member having a pair of engagement means adapted to be individually engaged by the corresponding sensor masses.

3. A sensor as defined in claim 1, wherein the sensor masses comprises a pair of pendulums which are pivoted about coaxial pins for motion along mutually parallel directions.

4. A sensor as defined in claim 3, wherein the trigger means comprises a pair of mutually parallel trigger levers which are pivotally supported by a sensor body by way of a lateral pivot pin which is integrally connected to and across the trigger levers.

5. A sensor as defined in claim 4, wherein each of the trigger levers comprises a first end which is engaged to the energy releasing means, a middle part integrally connected to the lateral pivot pin, and a second end which is normally engaged to one of the sensor masses.

6. A sensor as defined in claim 5, wherein the energy releasing means comprises a firing pin having an annular groove on its outer circumference and the first end of each of the trigger levers is provided with an inwardly directed lateral pin, the inwardly directed lateral pins of the trigger levers being normally engaged with the annular groove of the firing pin.

7. A sensor as defined in claim 1, wherein the first spring means comprises at least a pair of spring members.

8. A sensor as defined in claim 7, wherein the energy releasing means comprises a firing pin having an open ended hollow rear end received in an annular gap defined by a bore formed in a sensor body and a central rod fixedly held therein in a concentric relationship, and one of the spring members consists of a first compression coil spring interposed between an internal front end surface of the hollow rear end of the firing pin and a front end surface of the central rod while the other of the spring members consists of a second compression coil spring which is interposed between an annular rear end surface of the hollow rear end of the firing pin and a shoulder surface defined in a rear part of the central rod.

9. A sensor according to claim 1 in combination with the energy storage means.

10. A sensor according to claim 9 wherein said energy storage means includes a fuse and an explosive cartridge.

* * * * *